United States Patent
Mahajan et al.

(10) Patent No.: US 12,024,171 B2
(45) Date of Patent: Jul. 2, 2024

(54) MOVING OBJECT CONTROL DEVICE, MOVING OBJECT CONTROL METHOD, AND STORAGE MEDIUM

(71) Applicant: HONDA MOTOR CO., LTD., Tokyo (JP)

(72) Inventors: Aditya Mahajan, Wako (JP); Kenji Komori, Wako (JP); Aya Miura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 263 days.

(21) Appl. No.: 17/692,226

(22) Filed: Mar. 11, 2022

(65) Prior Publication Data
US 2022/0297696 A1   Sep. 22, 2022

(30) Foreign Application Priority Data
Mar. 17, 2021   (JP) .................................. 2021-043278

(51) Int. Cl.
| | | |
|---|---|---|
| B60W 30/18 | (2012.01) | |
| B60W 40/06 | (2012.01) | |
| G06V 20/56 | (2022.01) | |

(52) U.S. Cl.
CPC ...... *B60W 30/18163* (2013.01); *B60W 40/06* (2013.01); *G06V 20/588* (2022.01); *B60W 2420/403* (2013.01); *B60W 2552/53* (2020.02)

(58) Field of Classification Search
CPC .......... B60W 30/18163; B60W 40/60; B60W 2420/403; B60W 2552/53; B60W 60/001; B60W 2710/20; B60W 2720/106; G06V 20/588; G06V 20/58; G06V 10/70
USPC .......................................................... 701/41
See application file for complete search history.

(56) References Cited

U.S. PATENT DOCUMENTS

2021/0316733 A1* 10/2021 Mizoguchi ............ B60W 40/02

FOREIGN PATENT DOCUMENTS

JP   2020-027316   2/2020

* cited by examiner

*Primary Examiner* — Hai H Huynh
(74) *Attorney, Agent, or Firm* — Amin, Turocy & Watson, LLP

(57) ABSTRACT

A moving object control device includes a storage device storing a program and a hardware processor. The hardware processor executes the program stored in the storage device to acquire an image by imaging a space outside of a moving object, determine whether or not the moving object is traveling in a merging lane on the basis of the image, detect a first reference object and a second reference object according to image processing when it is determined that the moving object is traveling in the merging lane, virtually set a plurality of third reference objects extending parallel to the first reference object at a first prescribed width in a hypothetical plane virtually viewed from above, and derive information about a location where the merging lane disappears on the basis of at least a first intersection between the second reference object and the plurality of third reference objects.

10 Claims, 9 Drawing Sheets

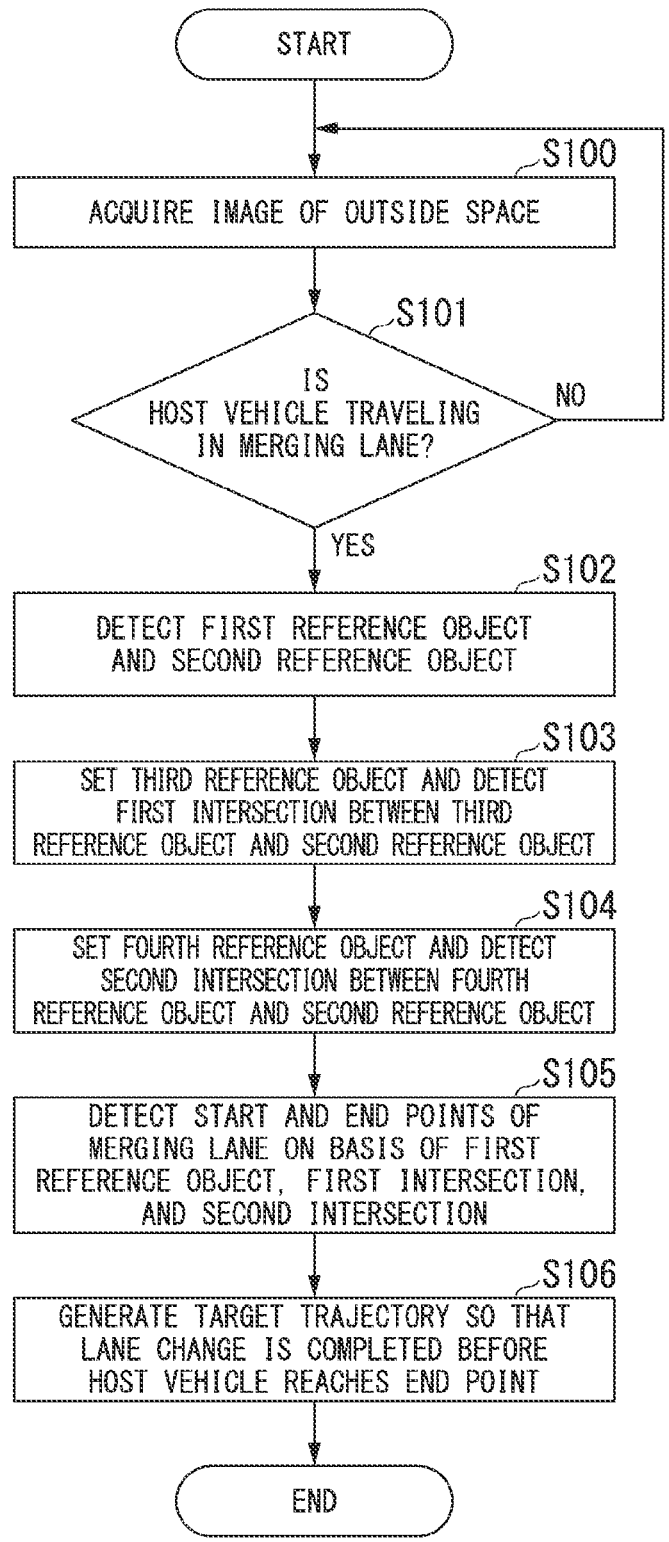

MOVING OBJECT CONTROL DEVICE, MOVING OBJECT CONTROL METHOD, AND STORAGE MEDIUM

CROSS-REFERENCE TO RELATED APPLICATION

Priority is claimed on Japanese Patent Application No. 2021-043278, filed Mar. 17, 2021, the content of which is incorporated herein by reference.

BACKGROUND

Field of the Invention

The present invention relates to a moving object control device, a moving object control method, and a storage medium.

Description of Related Art

Technology for determining whether or not a lane in which a vehicle is traveling is a merging lane is known. For example, Japanese Unexamined Patent Application, First Publication No. 2020-27316 discloses technology for determining whether or not a lane in which a host vehicle is traveling is a merging lane on the basis of map information.

SUMMARY

In the technology described in Japanese Unexamined Patent Application, First Publication No. 2020-27316, it is determined whether a lane is a merging lane or a merging-destination lane. However, in this technology, there is no process of detecting a start point where a decrease in a lane width of the merging lane starts and an end point where the decrease in the lane width thereof ends. As a result, for example, it may be difficult to determine a timing of a lane change appropriately during traveling in the merging lane in automated driving control of a vehicle.

The present invention has been made in consideration of such circumstances, and an objective of the present invention is to provide a moving object control device, a moving object control method, and a storage medium capable of appropriately determining a timing of a lane change during traveling in a merging lane.

A moving object control device, a moving object control method, and a storage medium according to the present invention adopt the following configurations.

(1): According to an aspect of the present invention, there is provided a moving object control device including: a storage device storing a program; and a hardware processor, wherein the hardware processor executes the program stored in the storage device to: acquire an image by imaging a space outside of a moving object; determine whether or not the moving object is traveling in a merging lane that disappears on a traveling direction side of the moving object on the basis of the image; detect a first reference object located on a main line side of the moving object and extending to the traveling direction side of the moving object in the image and a second reference object located on a side opposite to the main line side of the moving object and extending to the traveling direction side of the moving object in the image according to image processing when it is determined that the moving object is traveling in the merging lane; virtually set a plurality of third reference objects extending parallel to the first reference object at a first prescribed width in a hypothetical plane virtually viewed from above; and derive information about a location where the merging lane disappears on the basis of at least a first intersection between the second reference object and the plurality of third reference objects.

(2): In the above-described aspect (1), the hardware processor detects an end point where a decrease in a lane width of the merging lane ends on the first reference object, and the hardware processor derives a start point where the decrease in the lane width of the merging lane starts as information about a location where the merging lane disappears on the basis of the first intersection and the end point.

(3): In the above-described aspect (1), the hardware processor virtually sets a plurality of fourth reference objects extending parallel to the first reference object at a second prescribed width different from the first prescribed width in a hypothetical plane virtually viewed from above, and the hardware processor derives a start point where a decrease in the lane width of the merging lane starts and an end point where the decrease in the lane width of the merging lane ends as information about a location where the merging lane disappears on the basis of the first reference object, the first intersection, and a second intersection between the second reference object and the plurality of fourth reference objects.

(4): In the above-described aspect (1), the hardware processor sets initial objects obtained by iterating a process of extracting an initial object intersecting the second reference object and an object immediately before the initial object from among the plurality of third reference objects, setting a plurality of objects parallel to the first reference object at intervals, each of which is shorter than an interval between the third reference objects, in a direction from the object immediately before the initial object to the initial object, and extracting an initial object intersecting the second reference object and an object immediately before the initial object from among the plurality of objects set at the shorter intervals a prescribed number of times as the first intersection.

(5): In the above-described aspect (3), the hardware processor sets initial objects obtained by iterating a process of extracting an initial object intersecting the second reference object and an object immediately before the initial object from among the plurality of fourth reference objects, setting a plurality of objects parallel to the first reference object at intervals, each of which is shorter than an interval between the fourth reference objects, in a direction from the object immediately before the initial object to the initial object, and extracting an initial object intersecting the second reference object and an object immediately before the initial object from among the plurality of objects set at the shorter intervals a prescribed number of times as the second intersection.

(6): In the above-described aspect (3), the hardware processor extends a line segment connecting the first intersection and the second intersection, detects a third intersection between the extended line segment and the first reference object and a fourth intersection on the second reference object at which a length of a perpendicular line drawn from the extended line segment to the first reference object is equal to the lane width, determines the third intersection as the start point where a decrease in the lane width of the merging lane starts, and determines the fourth intersection as the end point where the decrease in the lane width of the merging lane ends.

(7): In the above-described aspect (1), the first prescribed width is a width of the moving object.

(8): In the above-described aspect (1), the hardware processor generates a target trajectory of the moving object so that the moving object completes a lane change before the moving object reaches the end point of the merging lane that has been derived and controls steering, acceleration, and deceleration of the moving object independently of an operation of a driver of the moving object so that the moving object travels along the generated target trajectory.

(9): According to an aspect of the present invention, there is provided a moving object control method including: acquiring, by a computer mounted in a moving object, an image by imaging a space outside of the moving object; determining, by the computer mounted in the moving object, whether or not the moving object is traveling in a merging lane that disappears on a traveling direction side of the moving object on the basis of the image; detecting, by the computer mounted in the moving object, a first reference object located on a main line side of the moving object and extending to the traveling direction side of the moving object in the image and a second reference object located on a side opposite to the main line side of the moving object and extending to the traveling direction side of the moving object in the image according to image processing when it is determined that the moving object is traveling in the merging lane; virtually setting, by the computer mounted in the moving object, a plurality of third reference objects extending parallel to the first reference object at a first prescribed width in a hypothetical plane virtually viewed from above; and deriving, by the computer mounted in the moving object, information about a location where the merging lane disappears on the basis of at least a first intersection between the second reference object and the plurality of third reference objects.

(10): According to an aspect of the present invention, there is provided a computer-readable non-transitory storage medium storing a program for causing a computer mounted in a moving object to: acquire an image by imaging a space outside of a moving object; determine whether or not the moving object is traveling in a merging lane that disappears on a traveling direction side of the moving object on the basis of the image; detect a first reference object located on a main line side of the moving object and extending to the traveling direction side of the moving object in the image and a second reference object located on a side opposite to the main line side of the moving object and extending to the traveling direction side of the moving object in the image according to image processing when it is determined that the moving object is traveling in the merging lane; virtually set a plurality of third reference objects extending parallel to the first reference object at a first prescribed width in a hypothetical plane virtually viewed from above; and derive information about a location where the merging lane disappears on the basis of at least a first intersection between the second reference object and the plurality of third reference objects.

According to the aspects (1) to (10), it is possible to appropriately determine a timing of a lane change during traveling in a merging lane.

BRIEF DESCRIPTION OF THE DRAWINGS

FIG. 9 is a flowchart showing an example of a flow of a process of the moving object control device according to the present embodiment.

DESCRIPTION OF EMBODIMENTS

Hereinafter, embodiments of a moving object control device, a moving object control method, and a storage medium of the present invention will be described with reference to the drawings. The moving object in the present invention is a four-wheeled vehicle, a two-wheeled vehicle, a micro-mobility, a robot, or the like. In the following description, it is assumed that the moving object is a four-wheeled vehicle.

Overall Configuration

Figure 1:
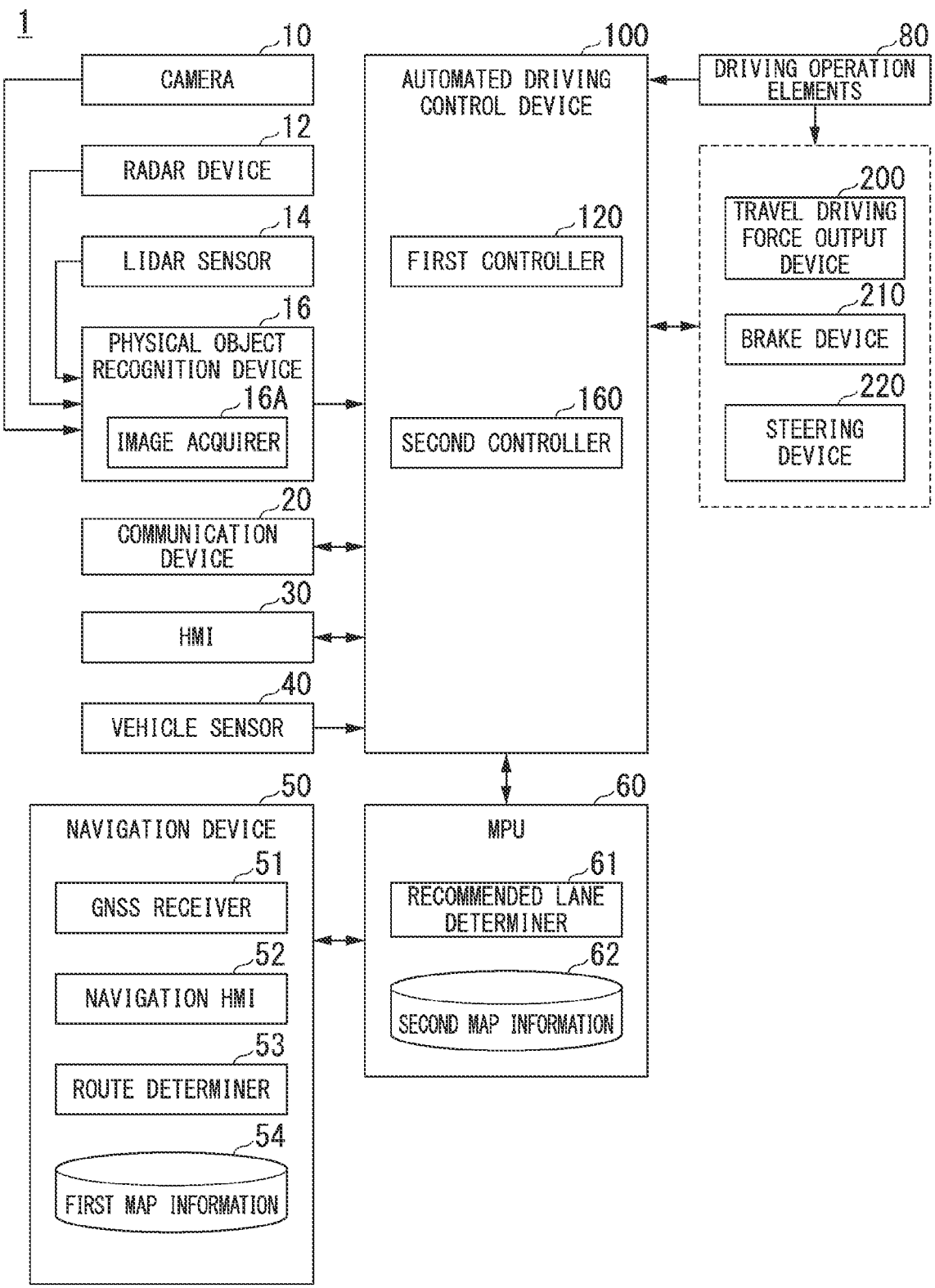
FIG. 1 is a configuration diagram of a vehicle system 1 using a moving object control device according to the present embodiment.

FIG. 1 is a configuration diagram of a vehicle system 1 using the moving object control device according to the present invention. A vehicle in which the vehicle system 1 is mounted is, for example, a vehicle such as a two-wheeled vehicle, a three-wheeled vehicle, or a four-wheeled vehicle. A driving source of these vehicles is an internal combustion engine such as a diesel engine or a gasoline engine, an electric motor, or a combination thereof. The electric motor operates using electric power generated by a power generator connected to the internal combustion engine, or electric power when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge coupled device (CCD) or a complementary metal oxide semiconductor (CMOS). The camera 10 is attached to any location on the vehicle (hereinafter, a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and a speed of the physical object in a frequency modulated continuous wave (FM-CW) scheme.

The LIDAR sensor 14 radiates light (or electromagnetic waves of a wavelength close to an optical wavelength) to the vicinity of the host vehicle M and measures scattered light. The LIDAR sensor 14 detects a distance to an object on the basis of a time period from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. In the present embodiment, the physical object recognition device 16 includes an image acquirer 16A and the image acquirer 16A acquires an image of a space outside of the vehicle imaged by the camera 10 and outputs the image to the automated driving control device 100 to be described below.

The communication device 20 communicates with another vehicle in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 provides an occupant of the host vehicle M with various types of information and receives an input operation by the occupant. The HMI 30 includes various types of display devices, a speaker, a buzzer, a touch panel, a switch, a key, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines in what lane numbered from the left the vehicle will travel. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

The driving operation elements 80 include, for example, an accelerator pedal, a brake pedal, a shift lever, a steering wheel, a variant steering wheel, a joystick, and other operation elements. A sensor for detecting an amount of operation or the presence or absence of an operation is attached to the driving operation element 80 and a detection result is output to the automated driving control device 100 or some or all of the travel driving force output device 200, the brake device 210, and the steering device 220.

The automated driving control device 100 includes, for example, a first controller 120 and a second controller 160. Each of the first controller 120 and the second controller 160 is implemented, for example, by a hardware processor such as a central processing unit (CPU) executing a program (software). Some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. A combination of the physical object recognition device 16 and the automated driving control device 100 is an example of a "moving object control device." A combination of the action plan generator 140 and the second controller 160 is an example of a "driving controller."

Figure 2:
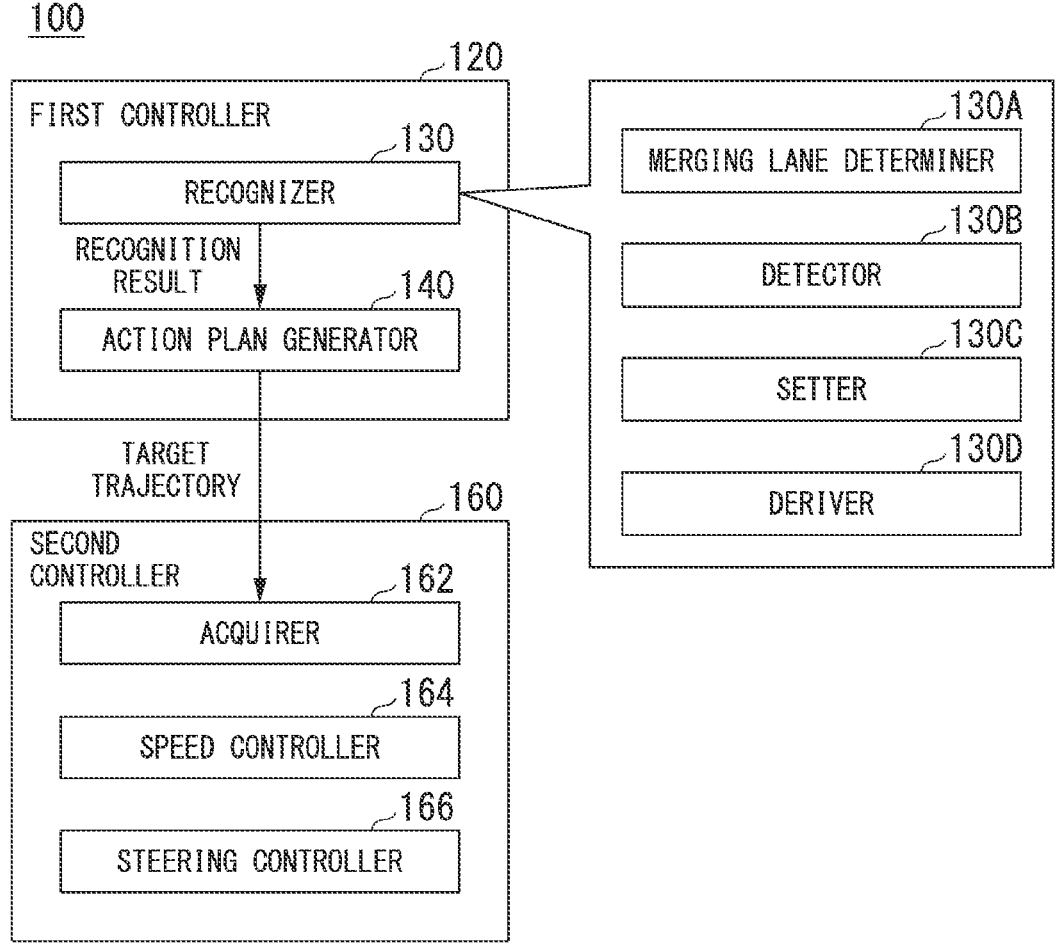
FIG. 2 is a functional configuration diagram of a first controller and a second controller.

FIG. 2 is a functional configuration diagram of the first controller 120 and the second controller 160. The first controller 120 includes, for example, a recognizer 130 and the action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured.

The recognizer 130 recognizes states of positions, speeds, acceleration, and the like of physical objects near the host vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented area. The "state" of a physical object may include acceleration or jerk of the physical object or an "action state" (for example, whether or not a lane change is being made or intended).

Also, for example, the recognizer 130 recognizes a lane in which the host vehicle M is traveling (a traveling lane). For example, the recognizer 130 recognizes the traveling lane by comparing a pattern of road markings (for example, an arrangement of solid lines and broken lines) obtained from the second map information 62 with a pattern of road markings in the vicinity of the host vehicle M recognized from an image captured by the camera 10. Also, the recognizer 130 may recognize the traveling lane by recognizing a traveling path boundary (a road boundary) including a road marking, a road shoulder, a curb stone, a median strip, a guardrail, or the like as well as a road marking. In this recognition, a position of the host vehicle M acquired from the navigation device 50 or a processing result of the INS may be added. Also, the recognizer 130 recognizes a temporary stop line, an obstacle, red traffic light, a toll gate, and other road events.

When the traveling lane is recognized, the recognizer 130 recognizes a position or orientation of the host vehicle M with respect to the traveling lane. For example, the recognizer 130 may recognize a gap of a reference point of the host vehicle M from the center of the lane and an angle formed with respect to a line connected to the center of the lane in a traveling direction of the host vehicle M as a relative position and orientation of the host vehicle M related to the traveling lane. Alternatively, the recognizer 130 may recognize a position of the reference point of the host vehicle M related to one side end portion (a road marking or a road boundary) of the traveling lane or the like as a relative position of the host vehicle M related to the traveling lane.

In the present embodiment, the recognizer 130 includes, in particular, a merging lane determiner 130A, a detector 130B, a setter 130C, and a deriver 130D, and details of functions thereof will be described below.

The action plan generator 140 generates a future target trajectory along which the host vehicle M automatically travels (independently of the driver's operation) so that the host vehicle M can generally travel in the recommended lane determined by the recommended lane determiner 61 and cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. Also, the trajectory point may be a position at which the host vehicle M is required to arrive at the sampling time for each prescribed sampling time. In this case, information about the target speed or the target acceleration is represented by an interval between the trajectory points.

The action plan generator 140 may set an automated driving event when a target trajectory is generated. Automated driving events include a constant-speed traveling event, a low-speed tracking event, a lane change event, a branch point-related movement event, a merge point-related movement event, a takeover event, and the like. The action plan generator 140 generates a target trajectory according to an activated event.

The second controller 160 controls the travel driving force output device 200, the brake device 210, and the steering device 220 so that the host vehicle M passes along the target trajectory generated by the action plan generator 140 at the scheduled times.

Returning to FIG. 2, the second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 executes a combination of feedforward control according to the curvature of the road in front of the host vehicle M and feedback control based on a deviation from the target trajectory.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic controller (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. Also, the brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operation element 80 to change the direction of the steerable wheels.

Operation

Figure 3:
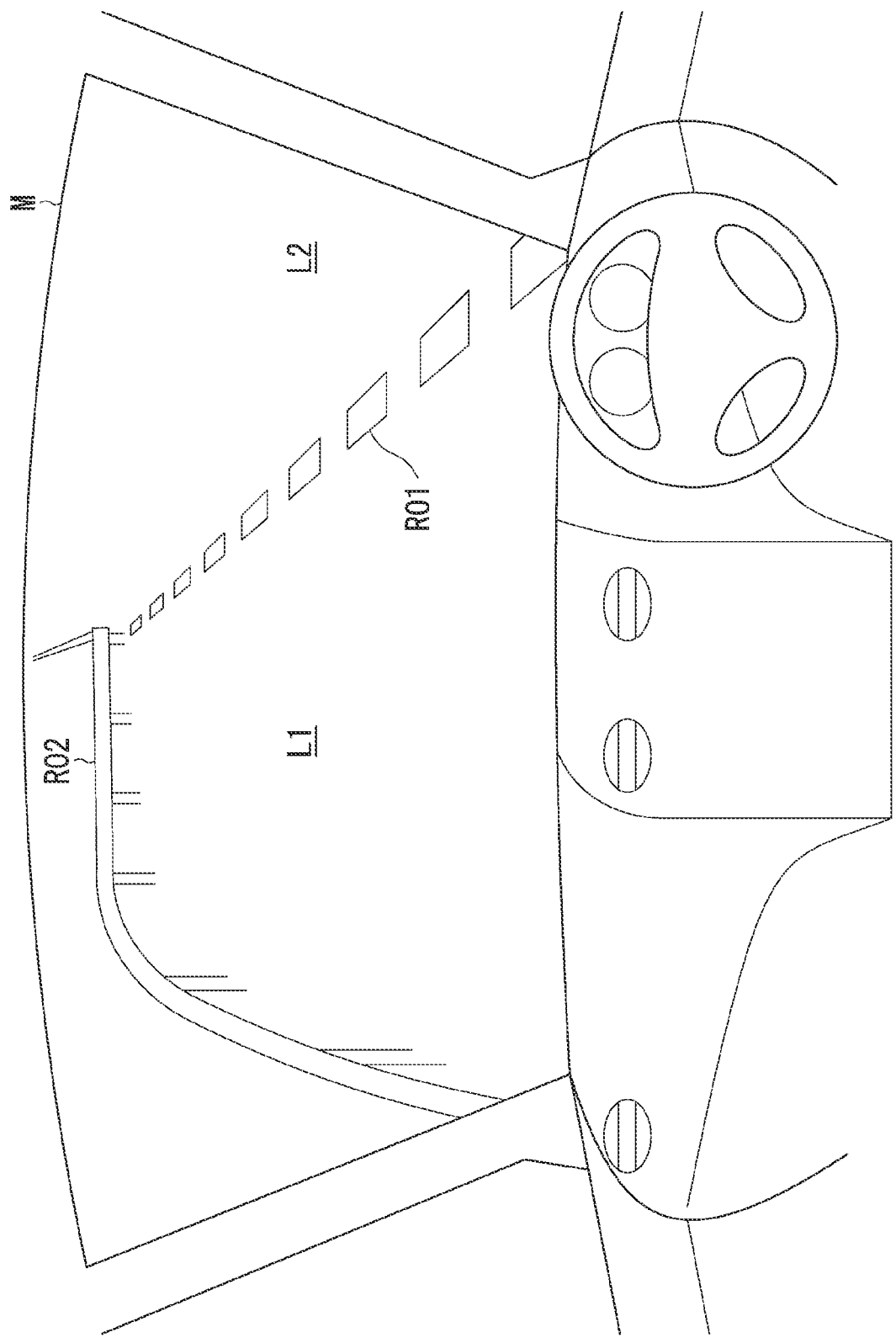
FIG. 3 is a diagram showing an example of a scene in which a process of the moving object control device according to the present embodiment is executed.

Next, a process of the moving object control device according to the present embodiment will be described with reference to FIGS. 3 to 8. FIG. 3 is a diagram showing an example of a scene in which the process of the moving object control device according to the present embodiment is executed. In FIG. 3, the host vehicle M is traveling in a merging lane L1 according to automated driving, makes a lane change, and enters a merging-destination lane L2. Generally, because a decrease in the lane width starts from a certain point and the lane width becomes zero so that the decrease in the lane width ends at another point in front of the certain point in the merging lane, the moving object control device is required to ascertain a start point where a decrease in a lane width of a merging lane starts and an end point where the decrease in the lane width of the merging lane ends in advance so that a timing where a lane change is made is determined. According to the present invention, such start and end points are derived and the derived start and end points are used to determine a timing when a lane change is made.

When an image of a space outside of the host vehicle M imaged by the camera 10 is acquired from the image acquirer 16A, the merging lane determiner 130A determines whether or not the host vehicle M is traveling in a merging lane that disappears on a traveling direction side of the host vehicle M on the basis of the image. Specifically, for example, when the second map information 62 indicates traveling in the merging lane and when the image of the space outside of the host vehicle M indicates that road markings (or guardrails) on the left and right sides of the traveling lane intersect or indicates a broken line shape specific to a merging path, the merging lane determiner 130A determines that the host vehicle M is traveling in the merging lane.

When the merging lane determiner 130A determines that the host vehicle M is traveling in the merging lane, the detector 130B detects a first reference object RO1 located on a main line side of the host vehicle M and extending to the traveling direction side of the host vehicle M in the image acquired from the image acquirer 16A and a second reference object RO2 located on a side opposite to the main line side of the host vehicle M and extending to the traveling direction side of the host vehicle M in the image according to image processing. Specifically, for example, the detector 130B extracts edge points having large luminance differences from adjacent pixels in the image acquired from the image acquirer 16A and detects the first reference object RO1 and the second reference object RO2 that are two reference objects on the left and right sides in the image on the basis of an extended length or shape of a contour in which the edge points are connected. Here, the first reference object RO1 and the second reference object RO2 are, for example, road markings and guardrails. In FIG. 3, the detector 130B detects the road marking as the first reference object RO1 and the guardrail as the second reference object RO2.

The setter 130C projects the image acquired from the image acquirer 16A onto a hypothetical plane virtually viewed from above and virtually sets a plurality of third reference objects RO3 extending parallel to the first reference object detected by the detector 130B at a first prescribed width in the hypothetical plane. The setter 130C may perform an associated process on an image plane. The same is also true for the other processes to be described below.

Figure 4:
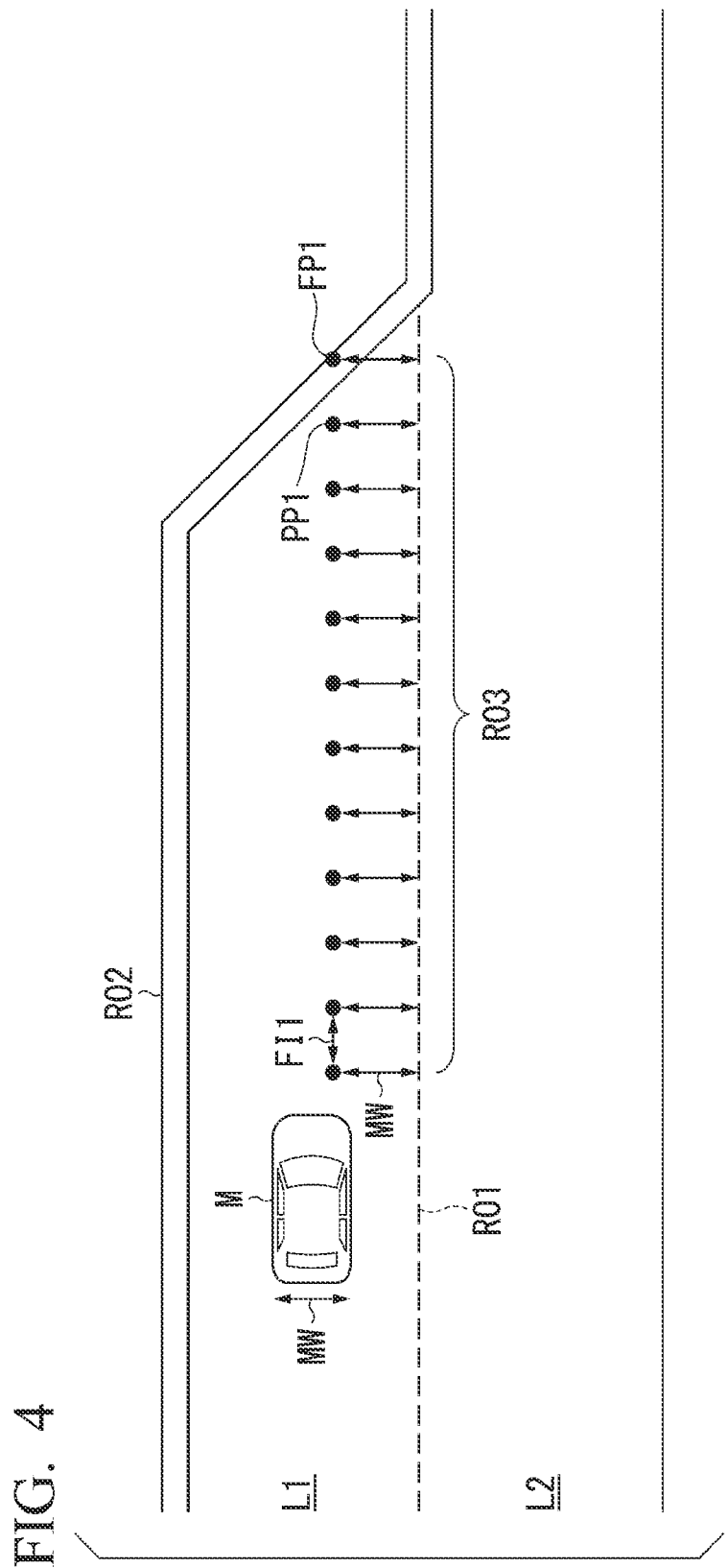
FIG. 4 is a diagram showing an example of a plurality of third reference objects set by a setter.

FIG. 4 is a diagram showing an example of a plurality of third reference objects RO3 set by the setter 130C. In FIG. 4, the setter 130C sets a plurality of dot-shaped third reference objects RO3 at prescribed intervals FI1 with the first prescribed width from the first reference object RO1. Here, the first prescribed width is, for example, a vehicle width MW of the host vehicle M.

The setter 130C further extracts an initial object FP1 intersecting the second reference object RO2 and an object PP1 immediately before the initial object FP1 from among the plurality of third reference objects RO3. When it is difficult to extract the object intersecting the second reference object RO2, the setter 130C resets the prescribed interval to a shorter interval and resets a plurality of third reference objects RO3.

Figure 5:
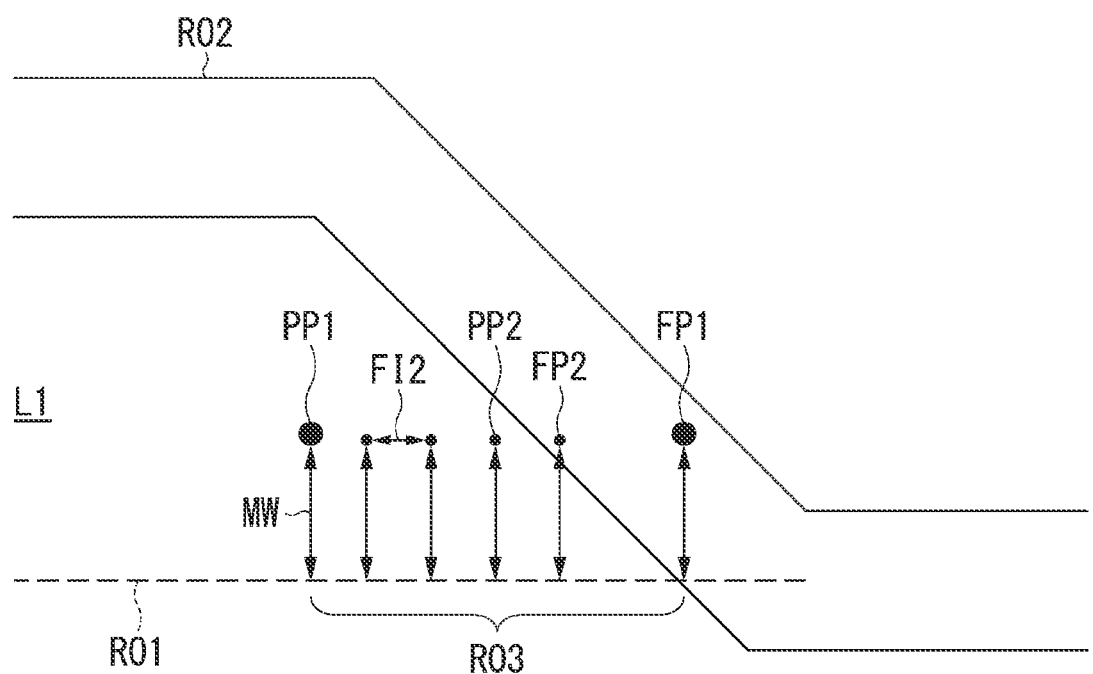
FIG. 5 is a diagram showing an example of a plurality of third reference objects additionally set by the setter.

Next, the setter 130C additionally sets a plurality of third reference objects RO3 parallel to the first reference object RO1 at intervals, each of which is shorter than an interval between the third reference objects RO3, in a direction from the extracted object PP1 immediately before the initial object FP1 to the initial object FP1. FIG. 5 is a diagram showing an example of the plurality of third reference objects RO3 additionally set by the setter 130C. In FIG. 5, the setter 130C sets the plurality of third reference objects RO3 at prescribed intervals FI2 in a direction from the object PP1 immediately before the initial object FP1 to the initial object FP1 with the first prescribed width with respect to the first reference object RO1. The prescribed interval FI2 at this time is set shorter than the prescribed interval FI1. The setter 130C extracts an initial object FP2 intersecting the second reference object RO2 and an object PP2 immediately before the initial object FP2 from among the plurality of third reference objects RO3 generated at shorter intervals. As shown in FIG. 5, the initial object FP2 extracted at this time is set closer to the host vehicle M as compared with the previous initial object FP1. The setter 130C sets an initial object FP(N) obtained by iterating the above process a prescribed number of times (N times) as a first intersection I1 between the second reference object RO2 and the third reference object RO3. Alternatively, the setter 130C may set the initial object FP(N) as the first intersection I1 at a timing when a distance between a previous initial object FP(N−1) and a current initial object FP(N) is less than a threshold value (for example, 1 m) without performing the above-described process a prescribed number of times.

Figure 6:
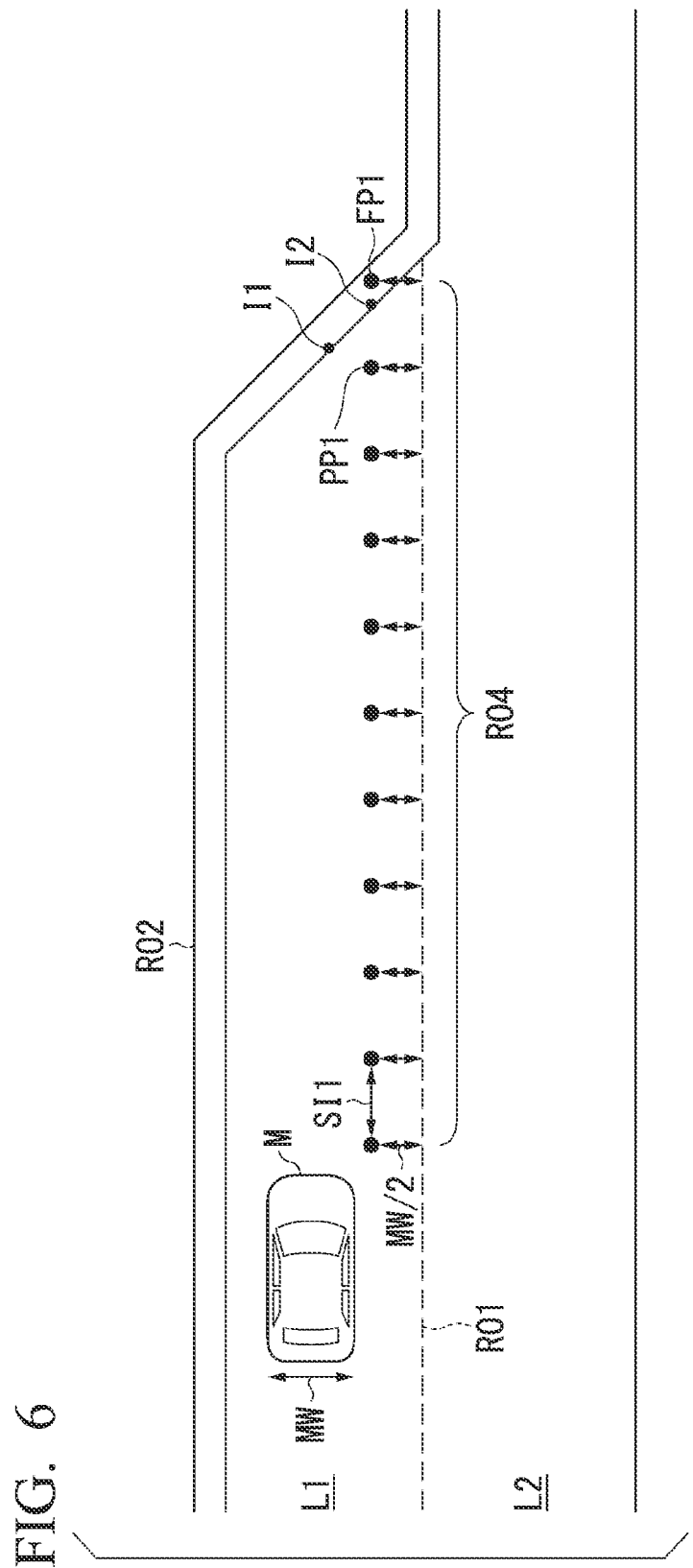
FIG. 6 is a diagram showing an example of a plurality of fourth reference objects set by the setter.

Next, in addition to the plurality of third reference objects RO3 that have been set, the setter 130C virtually sets a plurality of fourth reference objects RO4 extending parallel to the first reference object RO1 at a second prescribed width different from the first prescribed width. FIG. 6 is a diagram showing an example of a plurality of fourth reference objects RO4 set by the setter 130C. In FIG. 6, the setter 130C sets a plurality of dot-shaped fourth reference objects RO4 at prescribed intervals SI1 with a second prescribed width with respect to the first reference object RO1. Although the second prescribed width is, for example, half the length of the vehicle width MW of the host vehicle M here, it is only necessary to set a value different from the first prescribed width. A value of the prescribed interval SI1 may be the same as or different from a value of the prescribed interval FI1.

The setter 130C further extracts the initial object FP1 intersecting the second reference object RO2 and the object PP1 immediately before the initial object FP1 from among the plurality of fourth reference objects RO4. When it is difficult to extract the object intersecting the second reference object RO2, the setter 130C resets the prescribed interval to a shorter value and resets a plurality of fourth reference objects RO4.

Next, the setter 130C additionally sets a plurality of fourth reference objects RO4 parallel to the first reference object RO1 at intervals, each of which is shorter than an interval between the fourth reference objects RO4, in a direction from the extracted object PP1 immediately before the initial object FP1 to the initial object FP1. As in the case of FIG. 5, the setter 130C extracts an initial object FP2 intersecting the second reference object RO2 and an object PP2 immediately before the initial object FP2 from among the plurality of fourth reference objects RO4 generated at shorter intervals. The setter 130C sets an initial object FP(N) obtained by iterating the above process a prescribed number of times (N times) as a second intersection I2 between the second reference object RO2 and the fourth reference object RO4. Alternatively, the setter 130C may set the initial object FP(N) as the second intersection I2 at a timing when a distance between a previous initial object FP(N−1) and a current initial object FP(N) is less than a threshold value (for example, 1 m) without performing the above-described process a prescribed number of times. According to the above process, the first intersection I1 between the second reference object RO2 and the third reference object RO3 and the second intersection I2 between the second reference object RO2 and the fourth reference object RO4 are set.

Figure 7:
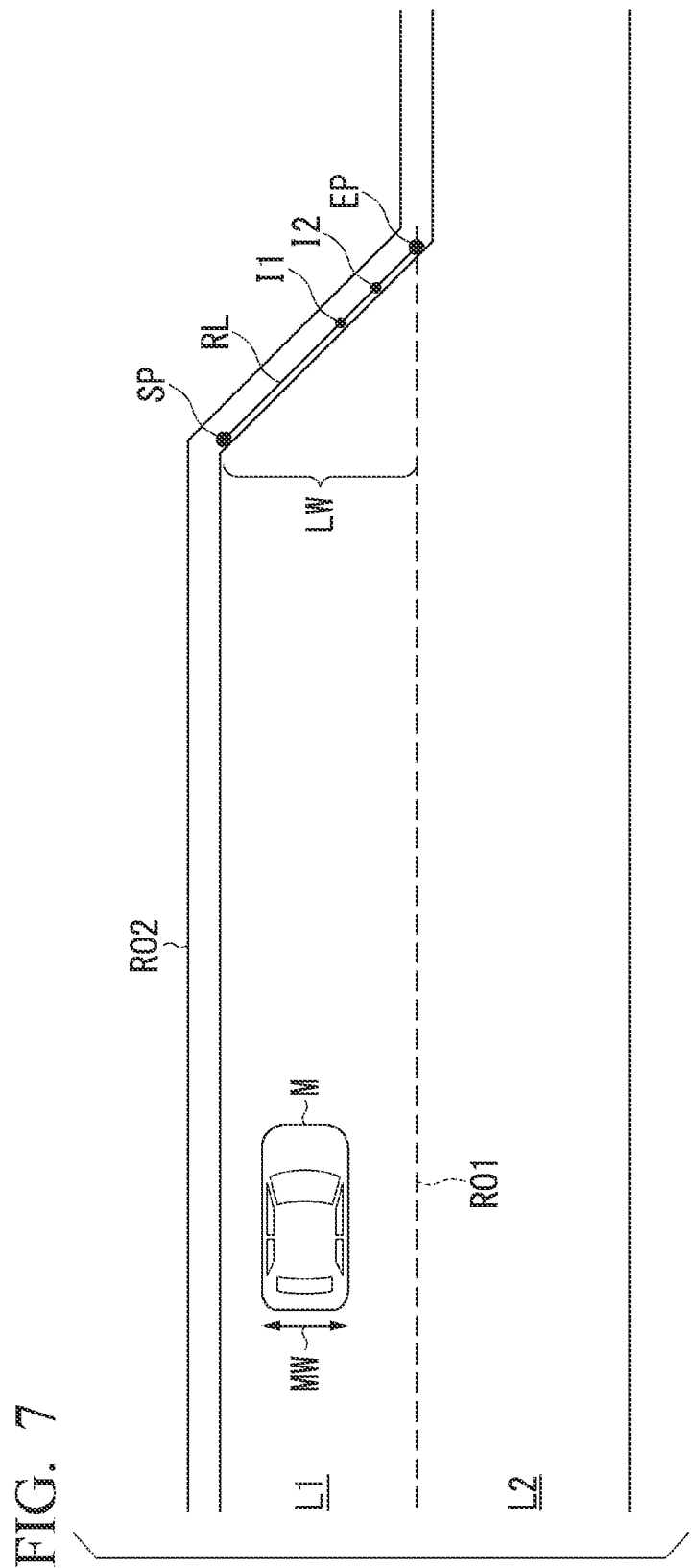
FIG. 7 is a diagram showing an example of a start point and an end point of a merging lane derived by a deriver.

The deriver 130D derives a start point SP where a decrease in the lane width of the merging lane L1 starts and an end point EP where the decrease in the lane width of the merging lane L1 ends as information about a location where the merging lane L1 disappears on the basis of the first reference object RO1, the first intersection IL and the second intersection I2. FIG. 7 is a diagram showing an example of the start point SP and the end point EP of the merging lane L1 derived by the deriver 130D. As shown in FIG. 7, the deriver 130D extends a line segment RL connecting the first intersection I1 and the second intersection I2 and derives a point on the second reference object RO2 at which a length of a perpendicular line drawn from the extended line segment RL to the first reference object RO1 is equal to a width LW of the lane L1 as the start point SP of the merging lane L1. The deriver 130D further derives an intersection between the extended line segment RL and the first reference object as the end point EP of the merging lane L1.

Also, in the above description, the deriver 130D derives the start point SP and the end point EP of the merging lane L1 using the first intersection I1 set using the third reference object RO3 and the second intersection I2 set using the third reference object RO3. However, the present invention is not limited to this configuration. For example, when the detector 130B has detected the end point EP using any image processing method, the deriver 130D may derive the start point SP on the basis of the first intersection I1 and the end point EP. Specifically, the deriver 130D extends a line segment connecting the first intersection I1 and the end point EP and derives a point on the second reference object RO2 at which a length of a perpendicular line drawn from the extended line segment to the first reference object RO1 is equal to the width LW of the lane L1 as the start point SP.

Figure 8:
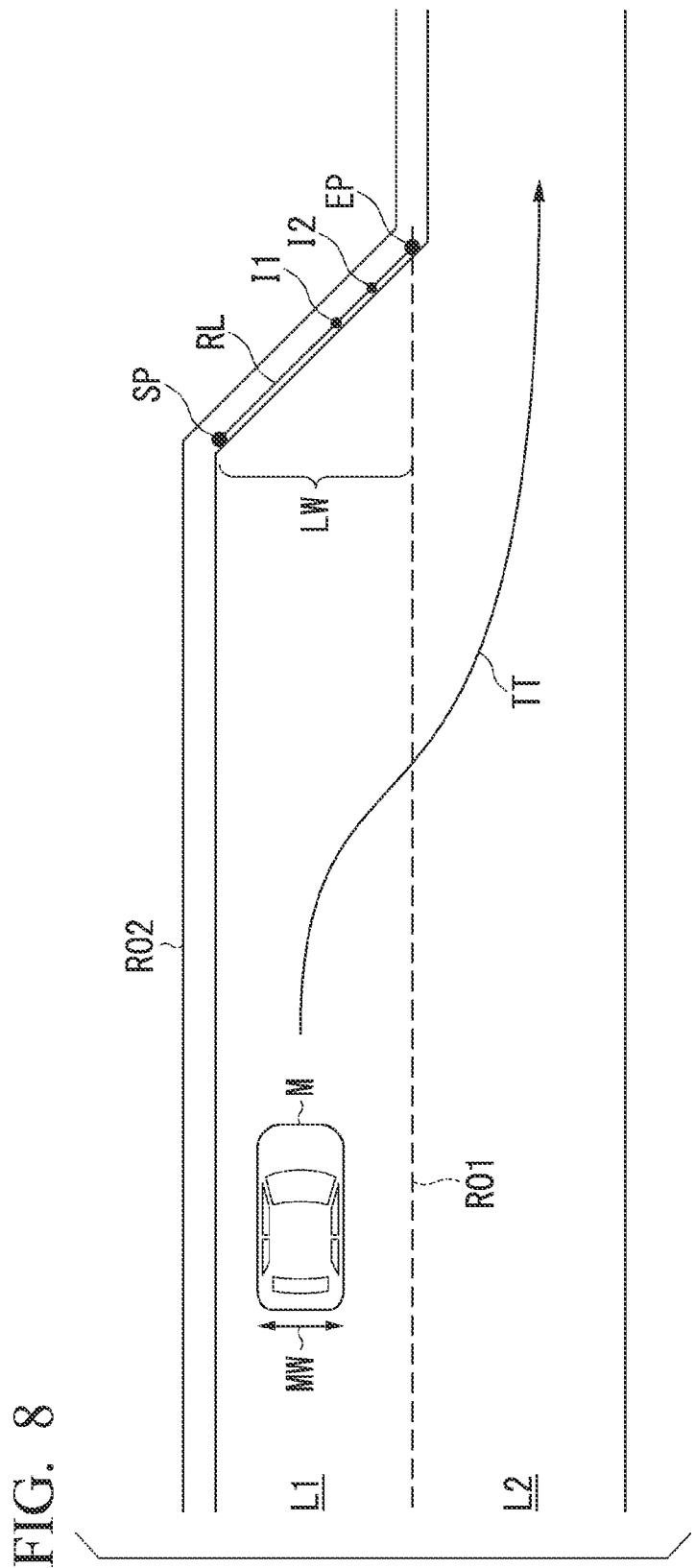
FIG. 8 is a diagram showing an example of a target trajectory generated by an action plan generator.

Subsequently, the action plan generator 140 acquires information about the start point SP and the end point EP of the merging lane L1 from the recognizer 130, and generates a target trajectory on the basis of the information. FIG. 8 is a diagram showing an example of a target trajectory generated by the action plan generator 140. As shown in FIG. 8, the action plan generator 140 generates a target trajectory TT of the host vehicle M so that the host vehicle M completes the lane change before the host vehicle M reaches the end point EP of the merging lane L1. The second controller 160 controls steering, acceleration, and deceleration of the host vehicle M so that the host vehicle M travels along the generated target track TT independently of the operation of the driver of the host vehicle M.

Next, a flow of a process of the moving object control device according to the present embodiment will be described with reference to FIG. 9. FIG. 9 is a flowchart showing an example of the flow of the process of the moving object control device according to the present embodiment. The process of the present flowchart is executed by the moving object control device for each prescribed control cycle (for example, 10 milliseconds).

First, the moving object control device uses the image acquirer 16A to acquire an image of a space outside of the host vehicle M imaged by the camera 10 (step S100). Subsequently, the moving object control device uses the merging lane determiner 130A to determine whether or not the host vehicle M is traveling in a merging lane on the basis of the image acquired by the image acquirer 16A (step S101). When the merging lane determiner 130A determines that the host vehicle M is not traveling in the merging lane, the moving object control device returns the process to step S100.

On the other hand, when it is determined that the host vehicle M is traveling in the merging lane, the moving object control device uses the detector 130B to detect the first reference object RO1 located on a main line side of the host vehicle M and extending to the traveling direction side of the host vehicle M in the image and the second reference object RO2 located on a side opposite to the main line side of the host vehicle M and extending to the traveling direction side of the host vehicle M in the image according to image processing (step S102). Subsequently, the moving object control device uses the setter 130C to virtually set a plurality of third reference objects extending parallel to the first reference object RO1 at a first prescribed width in a hypothetical plane virtually viewed from above and detect a first intersection between the plurality of third reference objects and the second reference object RO2 (step S103). Also, the moving object control device uses the setter 130C to virtually set a plurality of fourth reference objects extending parallel to the first reference object RO1 at a second prescribed width in a hypothetical plane and detects a second intersection between the plurality of fourth reference objects and the second reference object RO2 (step S104).

Subsequently, the moving object control device uses the deriver 130D to derive the start point SP and the end point EP of the merging lane L1 on the basis of the first reference object RO1, the first intersection I1, and the second intersection I2 (step S105). Subsequently, the moving object control device uses the action plan generator 140 to generate the target trajectory TT of the host vehicle M so that the lane change of the host vehicle M is completed before the host vehicle M reaches the end point EP of the merging lane L1. Thereby, the process of the present flowchart ends.

Also, an example in which the moving object control device of the present invention is applied to automated driving in the above-described embodiment has been described. However, the moving object control device of the present invention is not limited to the above-described configuration and can be applied to manual driving. In that case, it is only necessary for the moving object control device of the present invention to further include a driving instructor configured to generate a target trajectory on the basis of the derived start and end points of the merging lane and give at least one of a steering instruction and an acceleration/deceleration instruction so that an occupant of the host vehicle M performs a driving process along the generated target trajectory instead of the driving controller. The driving instructor can be implemented, for example, as a part of the function of the navigation device 50.

According to the present embodiment described above, the moving object control device derives the start point and the end point of the merging lane on the basis of the image captured by the camera 10 and determines a timing when a lane change is made in consideration of the start point and the end point. Thereby, it is possible to appropriately determine the timing of a lane change during traveling in the merging lane.

The embodiment described above can be represented as follows.

A moving object control device including:
a storage device storing a program; and
a hardware processor,
wherein the hardware processor executes the program stored in the storage device to:
acquire an image by imaging a space outside of a moving object;
determine whether or not the moving object is traveling in a merging lane that disappears on a traveling direction side of the moving object on the basis of the image;
detect a first reference object located on a main line side of the moving object and extending to the traveling direction side of the moving object in the image and a second reference object located on a side opposite to the main line side of the moving object and extending to the traveling direction side of the moving object in the image according to image processing when it is determined that the moving object is traveling in the merging lane;
virtually set a plurality of third reference objects extending parallel to the first reference object at a first prescribed width in a hypothetical plane virtually viewed from above; and
derive information about a location where the merging lane disappears on the basis of at least a first intersection between the second reference object and the plurality of third reference objects.

Although modes for carrying out the present invention have been described using embodiments, the present invention is not limited to the embodiments, and various modifications and substitutions can also be made without departing from the scope and spirit of the present invention.

What is claimed is:
1. A moving object control device comprising:
a storage device storing a program; and
a hardware processor,
wherein the hardware processor executes the program stored in the storage device to:
acquire an image by imaging a space outside of a moving object;
determine whether or not the moving object is traveling in a merging lane that disappears on a traveling direction side of the moving object based on the image;
detect, when it is determined that the moving object is traveling in the merging lane, a first reference object located on a main line side of the moving object and extending to the traveling direction side of the moving object in the image and a second reference object located on a side opposite to the main line side of the moving object and extending to the traveling direction side of the moving object in the image according to image processing;
virtually set a plurality of third reference objects extending parallel to the first reference object at a first prescribed width in a hypothetical plane virtually viewed from above; and
derive information about a location where the merging lane disappears based on at least a first intersection between the second reference object and the plurality of third reference objects.

2. The moving object control device according to claim 1, wherein the hardware processor detects an end point where a decrease in a lane width of the merging lane ends on the first reference object, and
wherein the hardware processor derives a start point where the decrease in the lane width of the merging lane starts as information about a location where the merging lane disappears based on the first intersection and the end point.

3. The moving object control device according to claim 1, wherein the hardware processor virtually sets a plurality of fourth reference objects extending parallel to the first reference object at a second prescribed width different from the first prescribed width in a hypothetical plane virtually viewed from above, and
wherein the hardware processor derives a start point where a decrease in the lane width of the merging lane starts and an end point where the decrease in the lane width of the merging lane ends as information about a location where the merging lane disappears based on the first reference object, the first intersection, and a second intersection between the second reference object and the plurality of fourth reference objects.

4. The moving object control device according to claim 1, wherein the hardware processor sets, as the first intersection, an initial object obtained by iterating a process of extracting an initial object intersecting the second reference object and an object immediately before the initial object from among the plurality of third reference objects, setting a plurality of objects parallel to the first reference object at intervals, each of which is shorter than an interval between the third reference objects, in a direction from the object immediately before the initial object to the initial object, and extracting an initial object intersecting the second reference object and an object immediately before the initial object from among the plurality of objects set at the shorter intervals a prescribed number of times.

5. The moving object control device according to claim 3, wherein the hardware processor sets, as the second intersection, an initial object obtained by iterating a process of extracting an initial object intersecting the second reference object and an object immediately before the initial object from among the plurality of fourth reference objects, setting a plurality of objects parallel to the first reference object at intervals, each of which is shorter than an interval between the fourth reference objects, in a direction from the object immediately before the initial object to the initial object, and extracting an initial object intersecting the second reference object and an object immediately before the initial object from among the plurality of objects set at the shorter intervals a prescribed number of times.

6. The moving object control device according to claim 3, wherein the hardware processor extends a line segment connecting the first intersection and the second intersection, detects a third intersection between the extended line segment and the first reference object and a fourth intersection on the second reference object at which a length of a perpendicular line drawn from the extended line segment to the first reference object is equal to the lane width, determines the third intersection as the start point where a decrease in the lane width of the merging lane starts, and determines the fourth intersection as the end point where the decrease in the lane width of the merging lane ends.

7. The moving object control device according to claim 1, wherein the first prescribed width is a width of the moving object.

8. The moving object control device according to claim 1, wherein the hardware processor generates a target trajectory of the moving object so that the moving object completes a lane change before the moving object reaches the end point of the merging lane and controls steering, acceleration, and deceleration of the moving object independently of an operation of a driver of the moving object so that the moving object travels along the generated target trajectory.

9. A moving object control method comprising a computer that is mounted in a moving object and performs operations comprising:

acquiring an image by imaging a space outside of the moving object;

determining whether or not the moving object is traveling in a merging lane that disappears on a traveling direction side of the moving object based on the basis of the image;

detecting a first reference object located on a main line side of the moving object and extending to the traveling direction side of the moving object in the image and a second reference object located on a side opposite to the main line side of the moving object and extending to the traveling direction side of the moving object in the image according to image processing when it is determined that the moving object is traveling in the merging lane;

virtually setting a plurality of third reference objects extending parallel to the first reference object at a first prescribed width in a hypothetical plane virtually viewed from above;

deriving information about a location where the merging lane disappears based on at least a first intersection between the second reference object and the plurality of third reference objects;

generating a target trajectory based on the information about the location; and controlling travel of the moving object based on the target trajectory.

10. A computer-readable non-transitory storage medium storing a program for causing a computer mounted in a moving object to:

acquire an image by imaging a space outside of a moving object;

determine whether or not the moving object is traveling in a merging lane that disappears on a traveling direction side of the moving object based on the image;

detect a first reference object located on a main line side of the moving object and extending to the traveling direction side of the moving object in the image and a second reference object located on a side opposite to the main line side of the moving object and extending to the traveling direction side of the moving object in the image according to image processing when it is determined that the moving object is traveling in the merging lane;

virtually set a plurality of third reference objects extending parallel to the first reference object at a first prescribed width in a hypothetical plane virtually viewed from above;

derive information about a location where the merging lane disappears based on at least a first intersection between the second reference object and the plurality of third reference objects;

generate a target trajectory based on the information about the location; and control travel of the moving object based on the target trajectory.

* * * * *